Oct. 4, 1949.     W. D. HERSHBERGER     2,483,829
MICROWAVE ACOUSTIC GAS ANALYSIS METHOD AND SYSTEM
Filed May 28, 1945     3 Sheets-Sheet 2
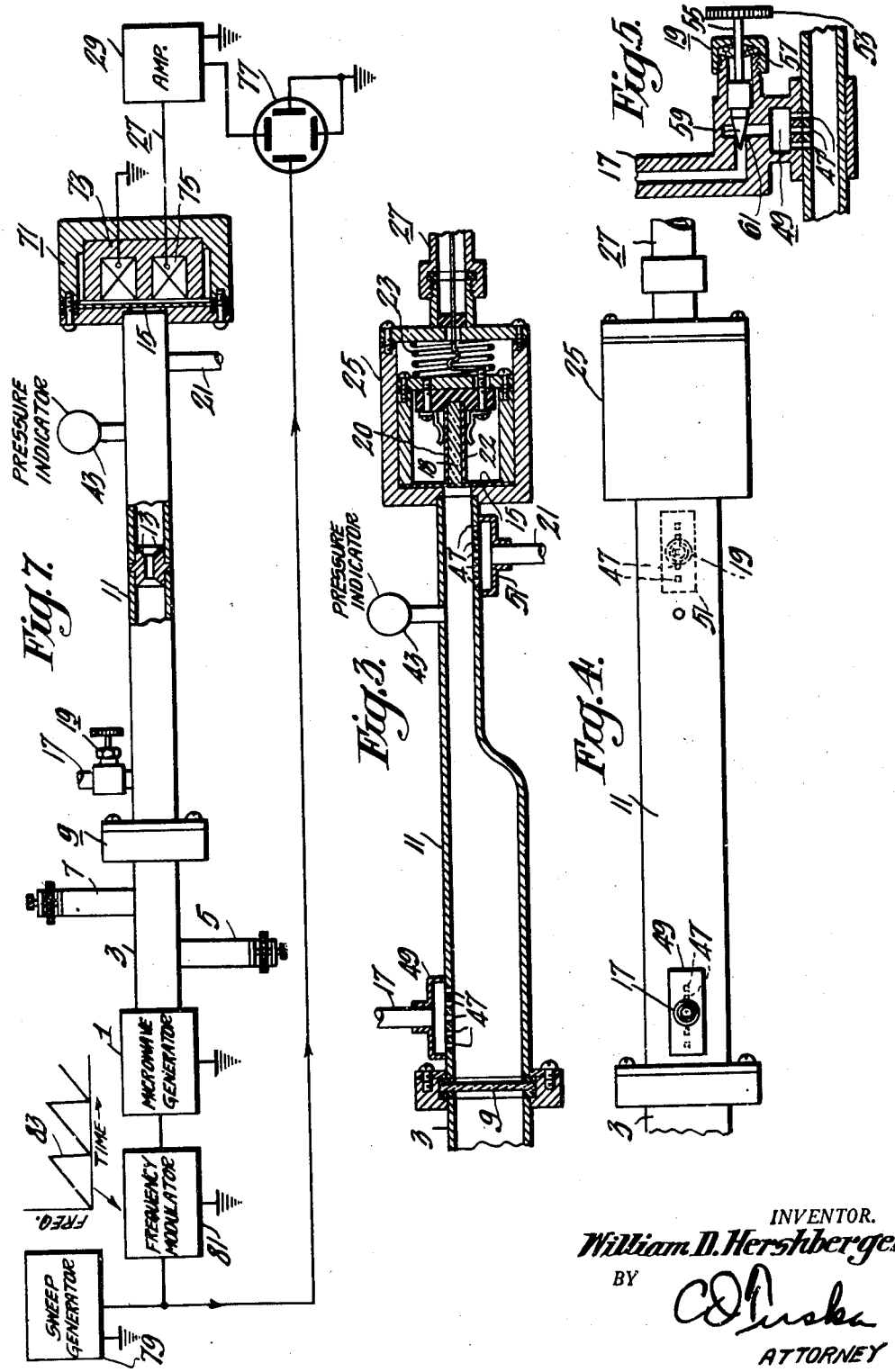
INVENTOR.
William D. Hershberger
BY
ATTORNEY

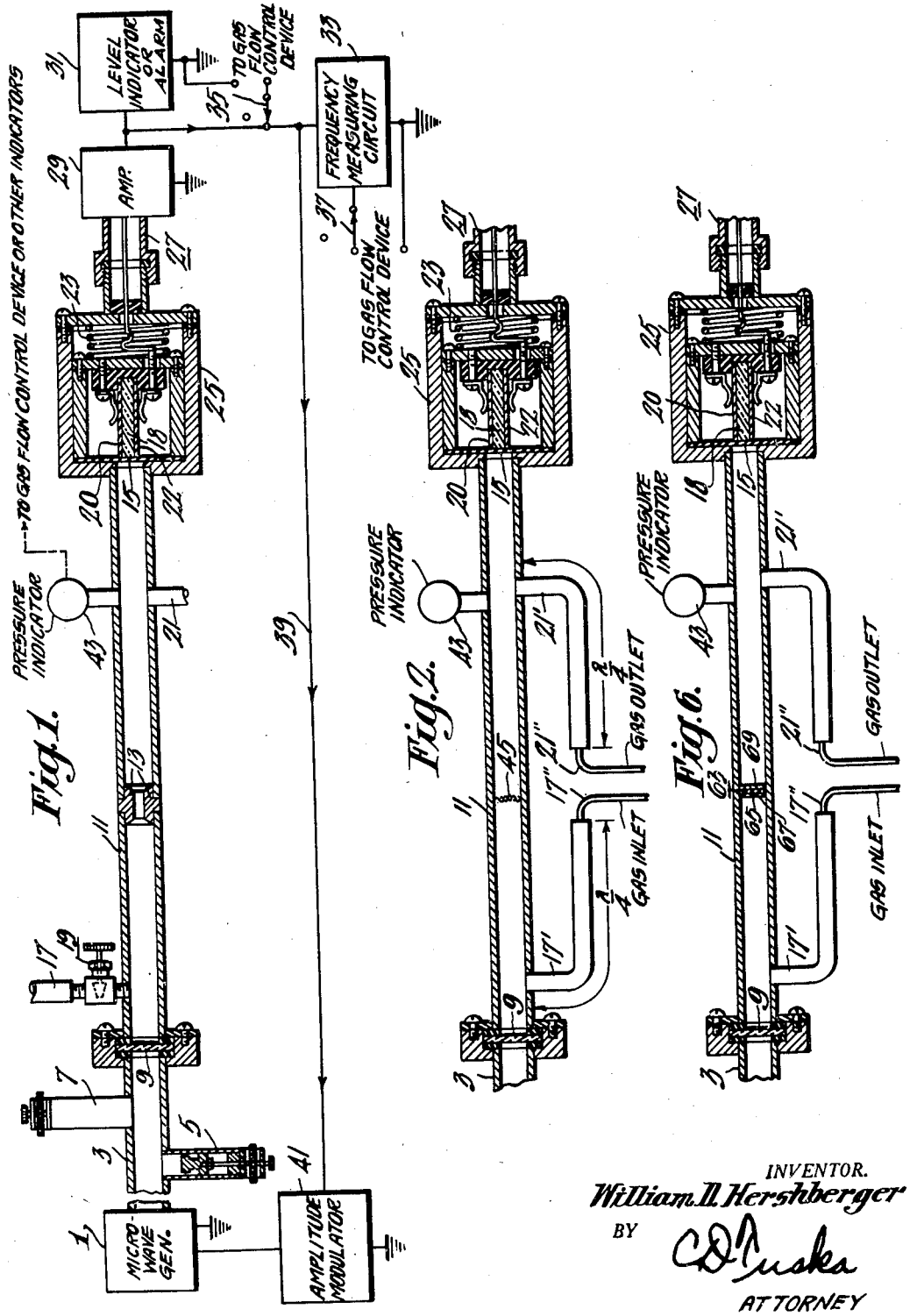

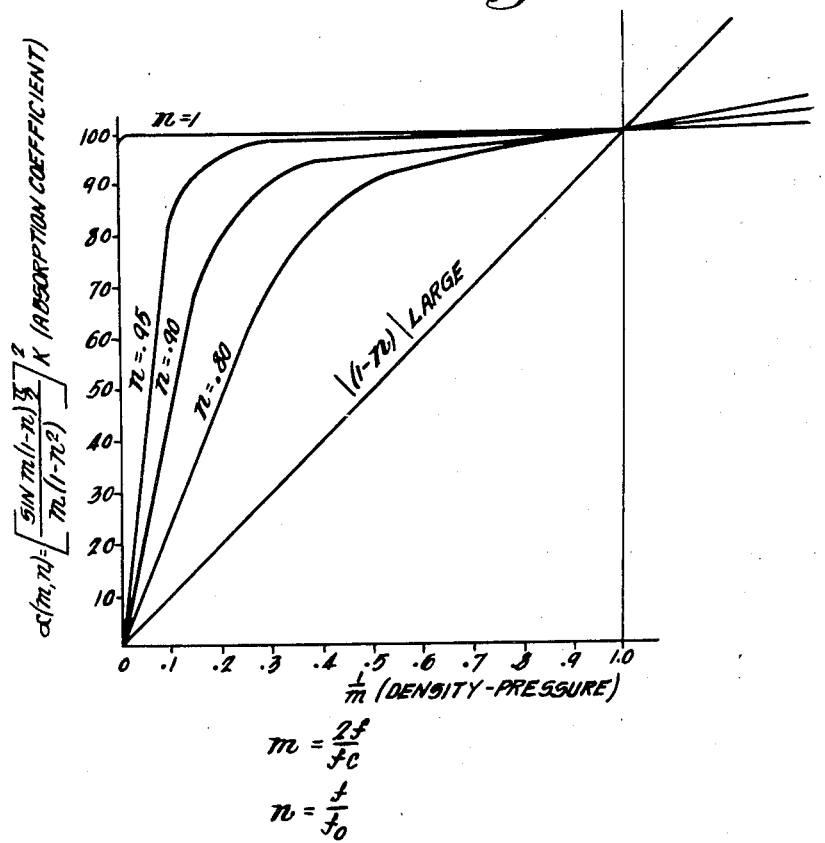

Patented Oct. 4, 1949

2,483,829

UNITED STATES PATENT OFFICE 2,483,829

MICROWAVE ACOUSTIC GAS ANALYSIS METHOD AND SYSTEM

William D. Hershberger, Princeton, N. J., assignor to Radio Corporation of America, a corporation of Delaware Application May 28, 1945, Serial No. 596,244

16 Claims. (Cl. 73—24)

This invention relates generally to improved methods of and systems for gas analysis and more particularly to combined microwave-acoustic and reflex methods and systems employing modulated microwaves for such analyses.

The instant invention comprises improvements upon and modifications of the systems and methods described and claimed in applicant's copending application Serial No. 596,242, filed May 28, 1945, assigned to the same assignee as the instant invention, wherein analysis of gas composition is provided by measurements of the microwave energy loss, variation of dielectric constant and the frequency of the irradiating microwaves as a function of the gas pressure.

Many gas distillation, cracking and other industrial gas processes require accurate analysis of various gas components encountered during the various steps of the process. The instant invention contemplates the analysis of gases by means of modulated microwaves having a frequency providing appreciable microwave absorption in at least some components of the gaseous mixture. The gaseous mixture is irradiated by the modulated microwaves in a cavity resonator which is electrically resonant to the microwave carrier frequency and which is acoustically resonant to the modulation component of the microwave frequency. Due to the varying characteristics of different gases, the acoustic resonant frequency may be made a function of the gas composition, as well as of gas pressure, temperature and rate-of-flow in a continuous process.

The modulation frequency component of the modulated microwaves establishes pressure variations in the irradiated microwave absorptive gas which are detected by means of piezo crystals or other pressure responsive devices of the types described, for example, in applicant's copending application Serial No. 596,243, filed May 28, 1945. In a first embodiment of the invention the modulation potentials derived from the pressure responsive detector are applied to a feedback circuit which amplitude-modulates the microwave carrier frequency source. Thus the closed or reflex system provides a microwave modulation frequency and a modulation output signal level from the detector which are characteristic of the gas composition as a function of gas pressure. A frequency measuring circuit and a detector output level indicator, both responsive to the detector output potentials may be calibrated to indicate separately or differentially the gas composition in terms of pressure.

Such gas analyses are extremely useful in monitoring chemical manufacturing processes, as well as for indicating operating characteristics, or for controlling the operation of such processes. Output potentials derived from the pressure-responsive detector may be applied to control suitable devices such as pressure regulators, control valves, mixing jets, or thermostatic controls for regulating the gas flow characteristics in a continuous gas analysis system.

Various gases, both inorganic, such as ammonia ($NH_3$), and organic, such as ethyl chloride, have been found selectively to absorb millimeter electromagnetic waves. The microwave absorption characteristic (absorption-coefficient v. frequency), of pure ammonia gas is described in an article by Cleeton and Williams in Physical Review 45, 234 (1934). The presence of ammonia in a mixture of non-absorbing gases may be detected by observing the loss factor or the acoustic resonance of the mixture of gases at a microwave carrier frequency in the neighborhood of the frequency for maximum microwave absorption.

This method may be employed for monitoring the production of ammonia by the Haber process. In this process the output of the catalyst chambers is a mixture of ammonia ($NH_3$), nitrogen ($N_2$) and hydrogen ($H_2$). The output mixture is cooled to below $-38.5°$ C. to liquify the ammonia while the uncombined $N_2$ and $H_2$ are then again compressed to 1000 atmospheres and raised in temperature to about 600° C., thereby necessitating great expenditure of energy.

Thus it is highly desirable in this process to determine the ammonia concentration before refrigeration. For this simple process a continuous sample of the gas mixture may be caused to flow continuously through a cavity resonator having definite dimensions and Q. The resonant frequency, both electric and acoustic, of the cavity resonator and its Q value are measured with an air dielectric, or when evacuated. The presence of the microwave absorptive gas mixture provides a two-fold effect (1) a change in the resonant frequencies, (both electric and acoustic) of the gas-filled resonator and (2) a drop in the resonator Q which is reflected as a drop in the output level of the microwave modulation detector. The magnitude of these effects depends upon the percentage of microwave absorptive gas which is present. Either or both effects may be employed to warn an operator that the percentage of ammonia in the mixture is above or below predetermined marginal limits. Also either or both effects may be employed to control the temperature, pressure, rate-of-flow, or proportions of the gas components in the continuous gas control process.

Heretofore gas production processes have required the taking of samples of the gases for chemical or spectroscopic analyses. Such analyses require considerable time and often also require that the production processes be interrupted until the analysis is completed, thus necessitating considerable unnecessary delay and expense. It is emphasized that the instant method and production provides continuous analyses of any desired portions of the production process, thereby permitting either mechanical or automatic control of the production process when the gas components vary between predetermined marginal limits.

When more complicated gaseous mixtures are involved such as in the manufacture of butadiene in synthetic rubber production, there is always the possibility of the production of gases other than those desired. Observations by means of the instant system at a variety of closely related microwave carrier frequencies and at different pressures may be necessary to determine the composition of the complex mixture. However, these observations may be made continuously or in rapid succession by means of separate cavity resonators supplied by gases at different points in the process thus providing substantially continuous monitoring and control.

Various modifications of the basic system described heretofore will be disclosed and described in detail hereinafter. Various mechanical and acoustic details are suggested to provide a simple, efficient and flexible process and system for continuous gas analysis. Such modifications include acoustic filtering devices for segregating the acoustic pressure variations in the cavity resonator from the gas circulation system external of said resonator. Also several modifications of cavity resonator structure are suggested for providing most efficient electromagnetic acoustic coupling between the microwave source and pressure responsive detector.

A second embodiment of the invention employs a microwave carrier frequency which is frequency-modulated by a sawtooth modulation frequency, whereby an unknown gaseous mixture may be "frequency scanned" to determine its microwave-absorptive frequency spectrum. The pressure variations in the gas due to the modulation may be detected by a magnetic or other sound-powered microphone or by a pressure responsive pickup. The detected signal may be compared against the modulating signal on an oscilloscope to indicate directly the absorption spectrum of the gases.

Among the objects of the invention are to provide an improved method of and means for analyzing gaseous mixtures. A second object of the invention is to provide an improved method of and means for detecting microwave absorptive gases. Another object is to provide improved methods of and means for measuring the proportions of microwave absorptive components of a gaseous mixture. An additional object is to provide improved methods of and means for determining the loss-factor and the microwave and acoustic resonant frequencies of microwave absorptive gases enclosed within a cavity resonator system. Another object of the invention is to provide improved methods of and means for determining the composition of microwave absorptive gaseous mixtures irradiated by modulated microwaves, as a function of the modulation frequency, the energy loss in the gas and the operating gas pressure.

An additional object is to provide improved methods of and means for establishing microwave and acoustic resonance in a microwave absorptive gas enclosed within a resonant chamber, wherein the system includes a feedback circuit for the modulation frequency component of the irradiating microwaves. A further object is to provide improved methods for analyzing gas composition as a function of the power level and frequency of the modulating component of modulated microwaves irradiating said gas wherein the gas composition is indicated in terms of the modulation energy level, the modulation frequency and the gas pressure. A further object is to provide improved methods of and means for controlling the temperature, pressure, rate-of-flow or composition of a gaseous mixture in response to microwave analysis of said mixture. Another object is to provide improved means for filtering acoustic pressure variations in a cavity resonator system from a gas circulation system connected to said cavity resonator system. Another object is to provide improved means for coupling modulated microwaves into a microwave absorptive gas-filled cavity resonator coupled to a pressure-responsive modulation detector. A further object is to provide an improved method of and means for analyzing the composition of a gaseous mixture by microwave irradiation in a cavity resonator wherein said microwaves are frequency modulated, and the acoustic resonance of the gas chamber is compared with the modulating component of the microwaves.

The invention will be described in greater detail by reference to the accompanying drawings of which Figure 1 is a cross-sectional, partially schematic diagram of a first embodiment of the invention; Figure 2 is a fragmentary, cross-sectional view of a first modification of said first embodiment of the invention; Figure 3 is a fragmentary, cross-sectional view of a second modification of said first embodiment of the invention; Figure 4 is a fragmentary plan view of said second modification of said first embodiment of the invention; Figure 5 is an enlarged fragmentary view of the control valve forming a portion of the system illustrated in Figure 1; Figure 6 is a fragmentary, cross-sectional view of a third modification of said first embodiment of the invention; Figure 7 is a partially cross-sectional, partially schematic diagram of a second embodiment of the invention; and Figure 8 is a family of graphs illustrative of the relations between microwave-absorption-coefficient and gas pressure. Similar reference characters are applied to similar elements throughout the drawings.

Referring to Figure 1 of the drawings, a microwave generator 1 is coupled through a waveguide 3 having tuning stubs 5 and 7 which, for example, may be of the type illustrated and described in applicant's copending application Serial No. 537,960 filed May 29, 1944, now Patent No. 2,471,744, to a microwave permeable window 9 opening into one end of a cavity resonator 11. The resonator 11 includes projections 13 extending from the opposite faces thereof at a point midway between the ends of the resonator for avoiding substantial microwave attenuation between the opposite ends of the resonator while permitting efficient acoustic coupling between said end portions for end-driving the resonator in response to the microwave energy.

The end of the resonator 11 remote from the microwave permeable window 9 is terminated by a flexible conductive diaphragm 15. A gas inlet conduit 17 having a control valve 19, and a gas outlet conduit 21 permit constant circulation through the cavity resonator 11 of the gas to be analyzed. The microwaves derived from the generator 1 are selected to have a carrier frequency of the order of the microwave absorption frequency of the gases to be analyzed. The tuning stubs 5 and 7 may be adjusted to tune the resonator to the microwave carrier frequency. When the microwaves are modulated in amplitude at a frequency to which the resonator is acoustically resonant, the pressure variations established in the microwave absorptive gas due to microwave energy losses therein, establish acoustic standing waves in the resonator which actuate the flexible diaphragm 15.

As explained in applicant's copending application Serial No. 596,243, filed May 28, 1945, the pressure variations applied to the flexible diaphragm 15 exert mechanical stresses upon a piezo crystal 18 in contact therewith, thereby establishing voltages between the crystal electrodes 20 and 22 which are characteristic of the magnitude and frequency of the acoustic resonance of the cavity resonator containing the gas to be analyzed. A helical spring 23 within the crystal housing 25 causes the crystal unit to exert constant pressure against the flexible diaphragm. The voltages established between the crystal electrodes 20, 22 are coupled through an output line 27 to the input of an amplifier 29.

The output circuits of the amplifier 29 are connected to a level indicator or alarm 31 which indicates the magnitude of the acoustic standing waves within the resonator. Also the output of the amplifier 29 is connected to a frequency measuring circuit 33 of any conventional type which indicates the frequency of the acoustic standing waves established within the resonator. The output of the amplifier 29 and the output of the frequency measuring circuit 33 also are connected through switches 35 and 37, respectively, to any type of control device, not shown, for selectively controlling the pressure, temperature, rate-of-flow, or composition of the gases to be analyzed.

An additional connection 39 from the output of the amplifier 29 to the input of a modulator 41 provides a feedback path for controlling the oscillations derived from the microwave generator 1. Thus the closed feedback loop from the amplifier through the modulator to the generator causes the generator to be amplitude-modulated at the frequency at which the cavity resonator enclosing the microwave absorptive gases is acoustically resonant. Since the microwave absorption and the physical characteristics of the gases in the cavity resonator determine the output level and frequency of the signals derived from the crystal detector, the level and frequency indications of said signals may be calibrated and employed to indicate the composition of said gases or employed to control the gas circulation through the associated gas system. Since the measurements of frequency or acoustic level are a function of the gas pressure, a pressure indicator 43, connected to the cavity resonator 11, may be employed to indicate said pressure or to control either directly or differentially the gas flow control device.

Figure 2 is similar in all respects to the cavity resonator and detector structure described heretofore with respect to Figure 1 with the exception that the opposite ends of the resonator 11 are segregated electrically and closely coupled acoustically by means of an apertured screen 45 extending across the center of the resonator intermediate the microwave permeable window 9 and the flexible diaphragm 15. Also, in order to prevent acoustic coupling of the gas pressure variations established in the resonator 11 to the gas circulation system external of the resonator, the input and output conduits 17' and 21' are of larger diameter than the remaining portions 17" and 21" of the gas circulating system for a distance from the resonator of one-quarter wavelength at the acoustic resonant frequency. This type of acoustic filtering provides effective isolation of the sound waves established within the cavity resonator, thereby increasing the acoustic efficiency and preventing leakage of said sound vibrations throughout the remainder of the gas circulation system.

Figure 3 is similar in all respects to the cavity resonator structure described in Figure 1 with the exception that instead of the conductive projections 13 at the center of the resonator 11, the resonator cross-sectional dimensions are reduced to below cutoff value for the microwave carrier frequency in the half-portion of the resonator adjacent the flexible diaphragm 15. This conformation provides substantial attenuation of the microwave coupling between the two halves of the resonator 11, while permitting close acoustic coupling between said portions. Also as shown in Figures 3 and 4, microwave and acoustic leakage into the inlet and outlet conduits 17 and 21 is substantially attenuated by means of a plurality of small holes 47 opening into the cavity resonator from the gas conduit manifolds 49 and 51, respectively.

Figure 5 shows in greater detail the structure of the manifold 49 and small apertures 47 as well as the structure of a typical gas control valve 19 arranged to control the passage of gases through the input conduit 17. The control valve may include a control knob 53 fastened to a shaft 55 which extends through a packing gland 57 to control the penetration of a tapered end portion 59 of the shaft 55. The tapered end portion 59 of the shaft 55 may be advanced to engage the sharp circular end 61 of the inner wall of the conduit 17. Any other conventional type of control valve may be substituted for the type illustrated and described herein.

The structure of Figure 6 is identical in all respects to that of Figure 2 with the exception that a flexible diaphragm 63 is substituted for the apertured screen 45 at the center of the resonator 11. The diaphragm may comprise, for example, a central core 65 of rubber or other flexible material having metallic coatings 67, 69 applied thereto in any conventional manner. The metallic coatings effectively isolate the microwaves to the half of the resonator 11 adjacent the microwave permeable window 9 thereby providing a single end drive as explained in greater detail in applicant's copending applications identified heretofore. However, the flexible characteristics of the diaphragm provide efficient acoustic coupling between the two portions of the resonator 11.

The device illustrated in Figure 7 employs a microwave generator 1, tuning stubs 5 and 7 and cavity resonator 11 including microwave permeable window 9 and flexible conductive diaphragm 15 of the same types as illustrated and described heretofore by reference to Figure 1. However, instead of the piezo crystal detector 18 described heretofore, the pressure-responsive diaphragm 15 controls the flux in a magnetic circuit such, for example, as a magnetic pickup 71. The pickup 71, illustrated, includes an E-shaped permanent magnet 73 disposed adjacent the flexible diaphragm 15 in a manner whereby vibration of the diaphragm 15 generates a current in a winding 75 surrounding the central portion of the permanent magnet 73. Currents derived from the winding 75 will be characteristic of the magnitude and the frequency of the acoustic standing waves established within the resonator 11. These currents may be coupled to the input of an amplifier 29 having its output connected to the vertical deflecting elements of a cathode ray oscilloscope 77.

A sweep frequency generator 79 may be connected to the horizontal deflecting elements of the oscilloscope 77 as well as to a frequency modulator 81 which varies the frequency of the microwave generator 1 in a manner such as shown in the graph 83. Although a sawtooth frequency-modulating signal is shown in the graph 83, it should be understood that any other desired wave shape may be employed.

The advantages of the frequency-modulated system thus described are that a continuous absorption spectrum of the gases under analysis may be provided upon the cathode ray oscilloscope 77, thereby indicating the absorption lines of the various microwave absorptive gas components of the gaseous mixture. This technique permits analysis of unknown gaseous mixtures wherein the particular types of microwave-absorptive components in the mixture are unknown prior to analysis. It also permits ready identification of the absorptive components due to the characteristic absorption spectral lines provided on the indicator.

Since the frequency selectivity of the absorption by gases of irradiating microwaves increases with decreasing pressure, separation of the spectral lines of a number of microwave gas components in a gaseous mixture will be facilitated by operating the gas-filled cavity resonator 11 at relatively low pressures. However, the sensitivity of the indications is reduced as the pressure is decreased. Therefore, an optimum pressure or pressure range must be selected for the particular measurements contemplated in view of the power limitations of the microwave generator and the sensitivity of the measuring circuits.

*The effect of gas pressure on microwave absorption*

In considering the effect of gas pressure upon the foregoing methods and systems for gas analysis, the factor of prime importance in determining the width of the spectral line in the microwave frequency range is the limitation placed on the length of a wave train absorbed by a molecule by intermolecular collisions. An impact or collision theory may be employed which assumes that a molecule absorbs (or emits) a sharp frequency $f_0$ during the time between collisions, and that each collision stops the radiation process completely. In applying Fourier integral methods to determine the spectral distribution corresponding to an interrupted sine wave train, many workers in this field have neglected the term involving $(f_0+f)$ in the denominator in comparison to the term involving $(f_0-f)$ because line width is assumed to be small with respect to line frequency. This procedure is not justified when the collision frequency and the operating frequency are of the same order of magnitude so both terms are included in the following analysis.

The frequency spectrum of a cosine wave train symmetrically placed with respect to the time origin and consisting of $m$ half-periods is first considered. The frequency is $f_0 = \omega_0/2\pi$. The Fourier transformation of interest is (1) $$g_1(\omega) = \frac{1}{\sqrt{2\pi}} \int_{-\frac{m\pi}{2\omega_0}}^{\frac{m\pi}{2\omega_0}} \cos \omega_0 t e^{-i\omega t} dt = \frac{A}{\omega_0}\sqrt{\frac{2}{\pi}} \frac{\cos \frac{mn\pi}{2}}{1-n^2}$$

where $n = \omega/\omega_0$, A is the amplitude of the cosine wave train, and $m$ is integral and odd.

On the other hand, for a sine wave train of amplitude A symmetrically placed with respect to the time origin and with $m$ even and integral, it is noted that (2) $$g_2(\omega) = -\frac{jA}{\omega_0}\sqrt{\frac{2}{\pi}} \frac{\sin \frac{mn\pi}{2}}{1-n^2}$$

The amplitude spectrum for this wave train is (3) $$\frac{A}{\omega_0}\sqrt{\frac{2}{\pi}} \frac{\sin \frac{mn\pi}{2}}{1-n^2}$$

As an interpolation formula, employ (4) $$g(\omega) = \frac{A}{\omega_0}\sqrt{\frac{2}{\pi}} \frac{\sin m(1-n)\pi/2}{1-n^2}$$

where $m$ is no longer restricted to integral values. $g_1(\omega)$ and $g_2(\omega)$ are special cases of $g(\omega)$.

Since $m$ is proportional to the time between collisions, both pressure and density are proportional to $1/m$. The assumptions involved in the present treatment are embodied in setting the absorption coefficient $\alpha$ proportional to $[g(\omega)/m]^2$, that is, we set (5) $$\alpha(m_1 n) = B\left[\frac{\sin m(1-n)\frac{\pi}{2}}{m(1-n^2)}\right]^2$$

where B is a constant involving quantum numbers, dipole moments, a Boltzmann factor giving the fraction of the total number of molecules capable of absorption any given temperature, and universal constants. It is to be emphasized that for any given pressure, $m$ is to be considered not as a constant but as lying in a range of values determined from kinetic theory considerations. $m/2$ is the ratio between the operating frequency $f$ and the molecular collision frequency $f_c$, that is $m = 2f/f_c$. $n$, however, is the ratio between operating frequency $f$, and the proper frequency of the molecular $f_0$, that is $n = f/f_0$. In plotting $\alpha$ against $1/m$ for large values of $(1-n)$, a difficulty is encountered owing to the fact that zeros occur in $g(\omega)$ for certain critical values of $m$. This happens at low pressures but is without physical significance, owing to the character of $m$. The situation here is quite unlike that found for example when a single sharply tuned electric circuit is used as an analyzer to explore a frequency spectrum such as $g(\omega)$ in which case the zeros found at certain critical frequencies are physically significant.

Figure 8 is a family of curves obtained by plotting $\alpha$ against pressure by assigning various values to $n$. The location of the knee in the curve is given very nearly by $1/m = 5/2(1-n)$ which occurs when (6) $$\frac{f}{f_0} = 1 - \frac{f_c}{5f}$$

By the use of this expression the proper frequency of the molecule may be determined when only the operating frequency and the collision frequency are known at the pressure for which a knee occurs on the experimental curve. In applying the above expression, a second difficulty is encountered owing to uncertainty in the value to assign to collision frequency for this kind of process. In considering experimental data for ammonia at both 1.25 and 3.2 cms., if $3 \times 10^9$ times per second is considered as a plausible value for $f_c$ when $f = 2.4 \times 10^{10}$ cycles per second, it is found that $n$ is very nearly equal to 0.97. Thus, it is seen that operation is within a few percent of the proper molecular frequency.

The conclusion that one may safely draw in spite of any uncertainties in the assumed value of $f_c$ is that when a knee occurs in the absorption curve at a relatively low pressure the operating frequency is quite close to the proper molecular frequency. A linear relationship between absorption and density indicates that the operating frequency is well removed from the proper molecular or electrically resonant frequency.

As indicated heretofore, a pressure gauge or other gas-pressure-responsive device may be employed to indicate the operating pressure or to control directly or differentially, in any known manner, the operating characteristics of the gases under analysis. Also the detector output level and modulation frequency indicators may have a plurality of calibrations for selected pressures or pressure ranges in order that the pressure function may be included in direct indications of gas composition. Any desired combined functions of absorption, modulation frequency, pressure and operating microwave frequency may thus be included in complex indicator calibrations for analyzing directly the compositions of complex gaseous mixtures. Also such combined effects may be employed to control regulatory apparatus in a continuous flow system.

Thus the invention disclosed comprises an improvement over the microwave gas analysis systems and methods disclosed in applicant's copending application wherein the acoustically resonant characteristics of the gas due to microwave irradiation are employed for indicating the characteristics of the gas under analysis.

I claim as my invention:

1. The method of analyzing the composition of gases having a microwave electromagnetic energy absorptive component enclosed within a gas chamber comprising irradiating said gases by modulated microwaves to establish acoustic pressure variations in said chamber, measuring the magnitude of said pressure variations, adjusting the modulation frequency of said microwaves, in accordance with said pressure variations and measuring said modulation frequency, whereby said microwave absorptive gaseous component may be determined as a function of the magnitude of said pressure variations and said modulation frequency.

2. The method according to claim 1 wherein said gases are continuously circulated through said gas chamber.

3. The method of analyzing the composition of gases having a microwave eletromagnetic energy absorptive component enclosed within a gas chamber comprising irradiating said gases by modulated microwaves to establish acoustic pressure variations in said chamber, measuring the magnitude of said pressure variations, utilizing said pressure variations to control the modulation frequency of said microwaves, and measuring said modulation frequency, whereby said microwave absorptive gaseous component may be determined as a function of the magnitude of said pressure variations and said modulation frequency.

4. Apparatus for analyzing the composition of gases having a microwave electromagnetic energy absorptive component including a chamber enclosing said gases, means for irradiating said gases in said chamber by modulated microwaves to establish acoustic pressure variations in said gas, means for detecting said acoustic pressure variations, means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

5. Apparatus according to claim 4 including means for circulating said gases through said chamber.

6. Apparatus for analyzing the composition of gases having a microwave electromagnetic energy absorptive component including a resonant chamber enclosing said gases, means for irradiating said gases in said chamber by modulated microwaves to establish acoustically resonant pressure variations in said gas, means for detecting said acoustic pressure variations, means for indicating the magnitude of said pressure variations, means for utilizing said detected pressure variations to control the modulation frequency of said microwave, and means for indicating said modulation frequency, whereby said microwave absorptive gas component may be determined as a function of the magnitude of said pressure variations and said modulation frequency.

7. Apparatus for analyzing the composition of gases having a microwave electromagnetic energy absorptive component including a chamber enclosing said gases, said chamber being electrically resonant to predetermined microwaves and acoustically resonant to a modulation component of said microwaves, means for irradiating said gases in said chamber by modulated microwaves to establish acoustic pressure variations in said gas, means for detecting said acoustic pressure variations, means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

8. Apparatus for analyzing the composition of gases having a microwave electromagnetic energy absorptive component including a waveguide conduit enclosing said gases, means intermediate the ends of said conduit providing substantial electrical attenuation and close acoustical coupling between the portions of said conduit on opposite sides of said means, means for irradiating said gases in said one portion of said conduit by modulated microwaves to establish acoustic pressure variations in said gas, means coupled to the other portion of said conduit for detecting said acoustic pressure variations, means responsive to said detecting means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

9. Apparatus for analyzing the composition of gases having a microwave electromagnetic energy absorptive component including a waveguide conduit enclosing said gases, cut-off waveguide means intermediate the ends of said conduit providing substantial electrical attenuation and close acoustical coupling between the portions of said conduit on opposite sides of said means, means for irradiating said gases in said one portion of said conduit by modulated microwaves to establish acoustic pressure variations in said gas, means coupled to the other portion of said conduit for detecting said acoustic pressure variations, means responsive to said detecting means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

10. Apparatus for analyzing the composition of gases having a microwave electromagnetic energy absorptive component including a waveguide conduit enclosing said gases, gas permeable means intermediate the ends of said conduit providing substantial electrical attenuation and close acoustical coupling between the portions of said conduit on opposite sides of said means, means for irradiating said gases in said one portion of said conduit by modulated microwaves to establish acoustic pressure variations in said gas, means coupled to the other portion of said conduit for detecting said acoustic pressure variations, means responsive to said detecting means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

11. Apparatus for analyzing the composition of gases having a microwave electromagnetic energy absorptive component including a waveguide conduit enclosing said gases, elastic shielding means intermediate the ends of said conduit providing substantial electrical attenuation and close acoustical coupling between the portions of said conduit on opposite sides of said means, means for irradiating said gases in said one portion of said conduit by modulated microwaves to establish acoustic pressure variations in said gas, means coupled to the other portion of said conduit for detecting said acoustic pressure variations, means responsive to said detecting means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

12. Apparatus for analyzing the composition of gases having a microwave electromagnetic energy absorptive component including a waveguide conduit enclosing said gases, means intermediate the ends of said conduit providing substantial electrical attenuation and close acoustical coupling between the portions of said conduit on opposite sides of said means, means including a microwave-permeable window closing one end of said waveguide for irradiating said gases in said one portion of said conduit by modulated microwaves to establish acoustic pressure variations in said gas, means coupled to the other portion of said conduit for detecting said acoustic pressure variations, means responsive to said detecting means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

13. Apparatus for analyzing the composition of gases having a microwave electromagnetic energy absorptive component including a waveguide conduit enclosing said gases, means intermediate the ends of said conduit providing substantial electrical attenuation and close acoustical coupling between the portions of said conduit on opposite sides of said means, means including a microwave-permeable window closing one end of said waveguide for irradiating said gases in said one portion of said conduit by modulated microwaves to establish acoustic pressure variations in said gas, piezo-electric means coupled to the other portion of said conduit for detecting said acoustic pressure variations, means responsive to said detecting means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

14. Apparatus for analyzing the composition of gases having a microwave electromagnetic energy absorptive component including a waveguide conduit enclosing said gases, means intermediate the ends of said conduit providing substantial electrical attenuation and close acoustical coupling between the portions of said conduit on opposite sides of said means, means including a microwave-permeable window closing one end of said waveguide for irradiating said gases in said one portion of said conduit by modulated microwaves to establish acoustic pressure variations in said gas, piezo-electric means and a flexible diaphragm end-coupled to said piezo-electric means closing the other portion of said conduit for detecting said acoustic pressure variations, means responsive to said detecting means for indicating the magnitude of said pressure variations, means for utilizing said detected pressure variations to control the modulation frequency of said microwaves, and means for indicating said modulation frequency, whereby said microwave absorptive gas component may be determined as a function of the magnitude of said pressure variations and said modulation frequency.

15. Apparatus according to claim 4 including means for circulating said gases through said chamber, and acoustic filter means in said circulating means for localizing said acoustic pressure variations in said chamber.

16. Apparatus according to claim 4 including an alarm responsive to predetermined values of said detected pressure variations for indicating a marginal limit of said microwave absorptive gas component.

WILLIAM D. HERSHBERGER.

REFERENCES CITED

The following references are of record in the file of this patent:

UNITED STATES PATENTS

| Number | Name | Date |
|---|---|---|
| 1,269,599 | Haber et al. | June 18, 1918 |
| 1,570,781 | Ruben | Jan. 26, 1926 |
| 1,726,721 | Schullstrom | Sept. 3, 1929 |
| 1,877,810 | Chamberlain | Sept. 20, 1932 |
| 2,020,847 | Mitereff | Nov. 12, 1935 |
| 2,099,687 | Hartig | Nov. 23, 1937 |
| 2,283,750 | Mikelson | May 19, 1942 |
| 2,323,675 | Rand | July 6, 1943 |
| 2,386,830 | Wright | Oct. 16, 1945 |

OTHER REFERENCES

Abello: Article in Physical Review, vol. 31, June 1928, pp. 1083 to 1091. Photostat copy in Class 73—24.